United States Patent [19]
Bassous et al.

[11] 3,949,410
[45] Apr. 6, 1976

[54] JET NOZZLE STRUCTURE FOR ELECTROHYDRODYNAMIC DROPLET FORMATION AND INK JET PRINTING SYSTEM THEREWITH

[75] Inventors: Ernest Bassous, Riverdale; Lawrence Kuhn, Ossining; Howard H. Taub, Mount Kisco, all of N.Y.

[73] Assignee: International Business Machines Corporation, Armonk, N.Y.

[22] Filed: Jan. 23, 1975

[21] Appl. No.: 543,569

[52] U.S. Cl. .................................. 346/75; 317/3
[51] Int. Cl.² ............................................ G01D 15/18
[58] Field of Search ................. 346/75, 140; 317/3

[56] References Cited
UNITED STATES PATENTS

| | | | |
|---|---|---|---|
| 3,871,004 | 3/1975 | Rittberg | 346/75 |
| 3,893,623 | 7/1975 | Toupin | 346/75 X |

*Primary Examiner*—George H. Miller, Jr.
*Attorney, Agent, or Firm*—Bernard N. Wiener

[57] ABSTRACT

The practice of this disclosure obtains a monolithic structure useful for electrohydrodynamically synchronizing the formation of droplets in a jet stream exiting from a jet nozzle. The monolithic structure is primarily adaptable for ink jet printing. The jet nozzle structure provided by the practice of this disclosure includes a jet nozzle design in a crystalline semiconductor block, e.g., of silicon (Si), germanium (Ge) or gallium arsenide (GaAs), with an electrode structure which is integrally incorporated therewith whereby a variable electric field is established proximate to the orifice of the jet nozzle structure. The electric field electrohydrodynamically perturbs the jet stream emitting from the jet nozzle structure so that formation of drops in the jet stream is controllably achieved, e.g., synchronously when the variable electric field is oscillating with a given periodicity.

50 Claims, 17 Drawing Figures

JET NOZZLE STRUCTURE FOR ELECTROHYDRODYNAMIC DROPLET FORMATION AND INK JET PRINTING SYSTEM THEREWITH

In an exemplary practice of this disclosure, a conductive region is integrally incorporated with a jet nozzle design formed from a block or wafer or substrate of single crystalline silicon either in or on said nozzle whereby a varying electric field is established proximate to the orifice such that the jet stream is temporally and spatially influenced electrohydrodynamically by said electric field. For a particular design of the conductive region, a doped Si region in the Si substrate is utilized therefor. In the fabrication of a particular type of jet nozzle design, which utilizes a block of single crystalline silicon during the fabrication of the jet nozzle, there is included a diffused $p^+$ region and an insulation layer which is formed either unitary therewith, e.g., by oxidation, or is formed ancillary thereto by deposition of an insulation layer. When a synchronizing signal is applied to said $p^+$ silicon layer, an oscillating electric field is established proximate to the orifice of the jet nozzle.

There is achieved by the practice of this disclosure a monolithic device for ink jet printing with a plurality of jets which are controllable either independently or cooperatively through appropriate integrated silicon semiconductor circuitry.

BACKGROUND OF THE INVENTION

There is considerable potential utility for printing of information via ink jet streams on targets, e.g., paper. However, for that potential actually to be achieved, it has been required that suitable jet nozzle orifices be designed which with ancillary structure and circuitry can accurately effect sequential drops or droplets of ink appropriately synchronized both temporally and spatially. It has been required that there be both printing via selected drops on a target, e.g. paper, and dispersion of unselected drops away from said target under controllable conditions.

In the prior art of ink jet printing, a mechanical vibration of a jet nozzle has been used to cause hydrodynamic disturbance in the jet stream exiting from the nozzle orifice to cause a separation of the stream into discrete drops. A background reference for ink jet printing with a mechanically vibrated jet stream is an article in IEEE Transactions on Electron Devices, Vol. ED 19, No. 4, April 1972 by Fred J. Kamphoefner entitled "Ink Jet Printing."

Among the prior techniques for establishing mechanically synchronized drop formation in a jet has been the utilization of a piezoelectric driver in order to vibrate the entire jet nozzle structure so that mechanical vibration of the jet stream is amplified as a result of the hydrodynamic instabilities in the jet stream for synchronizing the formation of drops. However, such vibrational technology lacks the appropriate controllability for effecting the jet drop formation and the coordinated jet stream requirements from a plurality of adjacent nozzles. In particular, it is difficult to achieve both uniform control of several jets from an array of nozzle orifices or the individual control of each said jet.

Further, it has been suggested heretofore that an oscillating electric field could synchronize the formation of drops in a jet stream exiting from a jet nozzle orifice. Illustratively, in the background literature, the book Field-Coupled Surface Waves, by J. R. Melcher, MIT Press 1963, at pages 131–135 discusses electrical force perturbation of a jet stream. Further, U.S. Pat. No. 3,586,907 issued June 22, 1971 mentions that an electric signal applied to an electrohydrodynamic plate can generate drops of uniform size in a jet stream at a uniform rate.

It has been determined heretofore that a jet nozzle design with appropriate jet orifice characteristics could be fabricated from a single crystalline region of silicon by chemical etching techniques. Especially suitable technologies for fabricating jet nozzle designs in single crystalline silicon which are useful for the practice of this invention are presented in considerable detail in copending and commonly assigned applications Ser. No. 537,799 filed on Dec. 31, 1974 by E. Bassous and Ser. No. 543,600 filed on the same date as the present application by E. Bassous et al. An article in the Journal of Electrochemical Society, Vol. 114 page 965 et seq., 1965, by R. M. Finne and D. L. Klein, describes chemical etching procedures adequate for fabricating a jet nozzle design useful for the practice of this invention.

It has remained necessary to establish appropriate electrode structures to accomplish electric field drop synchronization for practical ink jet printing purpose. The synchronization effect is electrical in origin and via an electric field perturbs the jet stream electrohydrodynamically. For semantic purpose, the following terminology and the like will be used interchangeably herein: "electrohydrodynamic" or "electric-field" or "electrical" drop synchronization.

OBJECTS OF THE INVENTION

It is an object of this invention to provide a monolithic structure incorporating both a jet nozzle design in a block of single crystalline semiconductor and an electrode structure integral therewith which can produce controlled electric fields in the vicinity of the jet nozzle orifice so that appropriate electrohydrodynamic instabilities can be achieved for electrical drop synchronization.

It is another object of this invention to provide apparatus wherein a jet nozzle design and other structural requirements for electrohydrodynamic drop synchronization are fabricated with technology compatible with present day integrated circuit processing procedures utilizing semiconducting silicon.

It is another object of this invention to provide a jet nozzle structure suitable for electrical drop synchronization of a jet stream emitted therefrom wherein there is an electrode structure integral with said jet nozzle so that an electric field can be established between a jet stream from said nozzle and said electrode proximate to the exit of the orifice thereof.

It is another object of this invention to embody the jet nozzle structure of the latter object by incorporating an electric field producing electrode and an insulator layer thereon which are integral with a silicon substrate for strong coupling of said electric field to said jet stream.

It is another object of this invention to provide an ink jet printing system having incorporated therewith electric field producing means and electric field control means as an integrated semiconductor circuit with a jet nozzle structure for electrohydrodynamic drop synchronization.

It is another object of this invention to provide the ink jet printing system with jet nozzle structure and associated components of the preceding object in accordance with the principles of this invention so that the members of an array of ink jets can be individually or collectively controlled so that the ink drops from each jet have a range of spatial and temporal relationships.

SUMMARY OF THE INVENTION

This invention provides a monolithic jet nozzle structure for electrohydrodynamic drop synchronization with which there is integrally incorporated control and circuit elements therefor. A jet nozzle design is fabricated in a single crystalline block of semiconductor, and an electrode structure is associated therewith which provides an oscillating electric field proximate to the exit orifice of the jet nozzle that is strongly coupled to the jet stream to induce electrohydrodynamic instability therein so that drops are formed synchronously downstream. The electrode structure for the jet nozzle structure includes a conductive layer which is established either as a doped region in the semiconductor block or on it close to the orifice of the jet nozzle. The electrode layer is appropriately insulated so that a suitably large electric field between the electrode and the jet stream may be maintained giving rise to strong electrohydrodynamic coupling.

One jet nozzle design useful for the practice of this invention comprises a pyramidal opening in a single crystalline silicon block with a membrane at the base thereof having an opening which is cylindrical.

Another jet nozzle design useful for the practice of this invention has a jet nozzle orifice which is approximately rectangular in shape, preferably nearly square, e.g., a pyramidal opening is established between parallel faces of a crystalline wafer with the larger square usually being an entrance for liquid and the smaller square being an orifice for a jet stream.

It is contemplated for the practice of this invention that the smaller opening of the jet nozzle design will usually be the exit for the jet stream and that the larger opening thereof will be the entrance for the liquid.

In the practice of one aspect of this invention, the requisite electrode structure for establishing the electric field for the electrohydrodynamic drop synchronization in accordance with the principles of this invention is achieved through th original silicon block from which there is established the initial jet nozzle design. The electrode conductor is a doped region within the block of silicon. The electrode is insulated from the jet stream by an insulation layer which is formed by oxidizing or by otherwise insulating the silicon at the surface at the regions of contact with the entering and exiting jet liquid.

In the practice of another aspect of this invention, the electrode conductor and the insulation separating it from the jet liquid are established as additional layers on the original silicon block within which there is formed the jet nozzle design.

Electronic circuit elements and interconnections therefor are established in conjunction with the silicon block according to integrated semiconductor circuit technology procedures of the prior are which are especially adapted for the practice of this invention so that the electrode of the jet nozzle may be appropriately energized for synchronizing the formation of the jet drops. In particular, integrated semiconductor circuits are provided in conjunction with the jet nozzle structure of this invention so that a plurality of jet nozzles may be controllably synchronized for ink jet printing in a coordinated manner.

ADVANTAGES OF THE INVENTION

A monolithic structure is disclosed for electrohydrodynamic drop synchronization of a jet stream. An ink jet printing system which incorporates the jet nozzle structure of this invention has simplicity of fabrication and wide band operation. There is uniformity of excitation of each jet nozzle structure in an array of said nozzles which is independent of frequency. There is capability through the practice of this invention of establishing several of the ancillary requirements for ink jet printing in cooperative structural arrangement with the jet nozzle structure provided in accordance with the principles of this invention.

A jet nozzle structure provided in accordance with the principles of this invention is relatively insensitive to the temperature of the liquid or changes in the viscosity thereof because of the structure of the nozzle. The physical mechanism by which the synchronizaion of the drops is achieved does not depend upon the mechanical properties of the jet nozzle design.

The jet nozzle structure in accordance with the principles of this invention incorporates electrohydrodynamic drop synchronization structure as an integral part thereof. It has advantageous properties of: good directionality, uniformity of temporal and spatial formation of initial drops in the jet stream, and uniformity of velocity of the drops. These properties are particularly important to achieve accurate printing with an array of nozzles.

BRIEF DESCRIPTION OF THE DRAWINGS

FIGS. 6A and 6B are representative of preliminary fabrication steps for the fabrication of the embodiment of this invention shown in FIG. 6C wherein FIG. 6A shows the development of a small recess on the exit side of the nozzle and FIG. 6B shows the establishing of the larger pyramidal recess on the entrance side of the nozzle.

PRINCIPLES OF THE INVENTION

It is known in the prior art that a jet stream from a nozzle orifice ultimately breaks up into spherical drops with essentially random temporal and spatial distribution. It is essential for practical purpose that there be controllable formation of the drops with given spatial and temporal relationships.

Through the principles of this invention, an oscillating electric field appropriately causes an electrohydrodynamic perturbation in a jet stream proximate to the orifice of the jet nozzle structure, and there is a separation of the jet stream into discrete drops at a controlled distance downstream from the orifice. The development of the art of ink jet printing is significantly advanced by the technology of this invention for fabricating jet nozzle structures and requisite electronic control circuits by adapting technology known in the integrated semiconductor circuit field. Exemplary technology of the semiconductor circuit field useful for the practice of this invention is presented by the following identified books:

a. Physics and Technology of Semiconductor Devices, by A. S. Grove. John Wiley and Sons, Inc., 1967.
b. Physics of Semiconductor Devices, by S. M. Sze, John Wiley and Sons, Inc., 1969.
c. Fundamentals of Silicon Integrated Device Technology, edited by Burger and Donovan, Prentice-Hall, Inc., 1967; Vol. I, "Oxidation, Diffusion and Epitaxy"; Vol. II, "Bipolar and Unipolar Transistors."

In accordance with the principles of this invention, a monolithic structure is fabricated from and with silicon which includes a jet nozzle orifice, an electric field producing electrode structure and the requisite circuits for establishing electrohydrodynamic synchronization of drops formed in a jet stream exiting from the orifice of the jet nozzle.

Figure 1A:
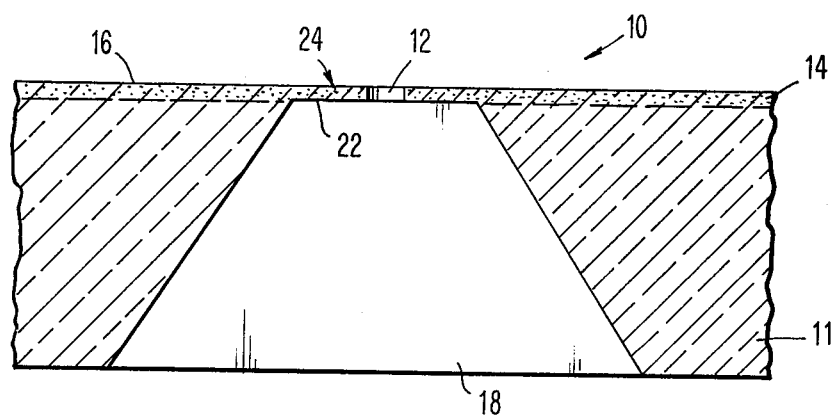
FIGS. 1A and 1B present elevation and plan views respectively of a jet nozzle design established in a block of single crystalline silicon which has an orifice located in a membrane at the base of a pyramidal opening. The design is suitable as a basis for the practice of this invention which provides a jet nozzle structure incorporating capability for electrohydrodynamic jet drop synchronization.
Figure 1B:
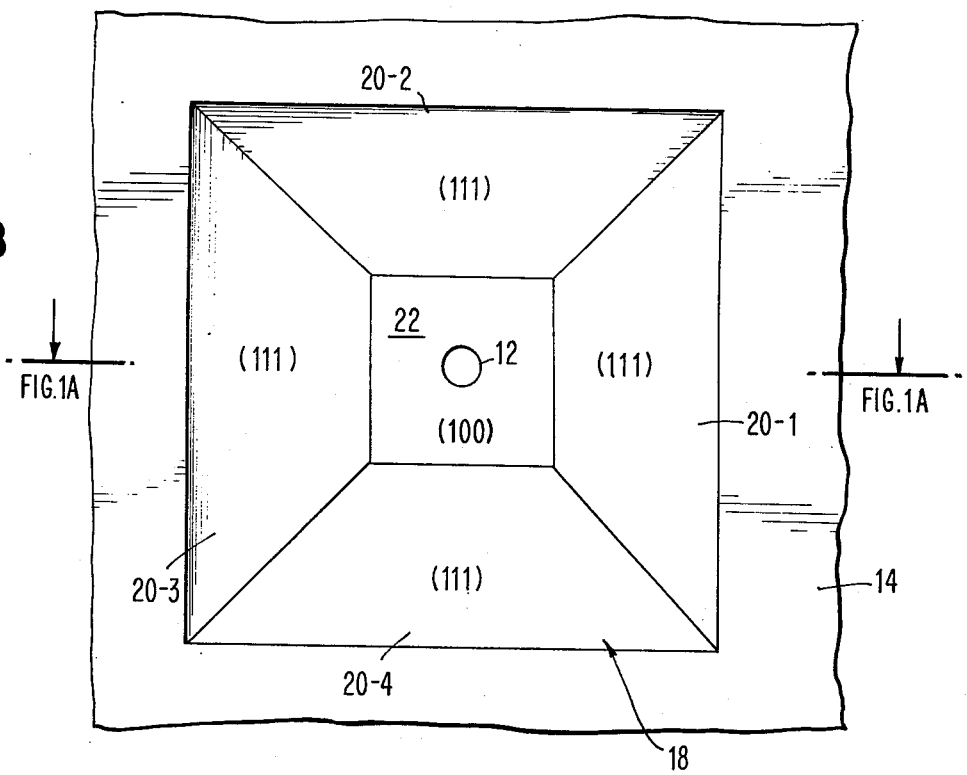

A jet nozzle design 10 has been developed heretofore which is illustrated in FIGS. 1A and 1B which utilizes a single crystalline silicon block 11. An especially suitable fabrication procedure for jet nozzle design 10 is disclosed in copending and commonly assigned application Ser. No. 537,799 filed on Dec. 31, 1974 by E. Bassous. Chemical etching procedures conventional in the technology of integrated semiconductor circuits based on silicon may be satisfactorily utilized for fabrication of the basic jet nozzle design 10 with orifice 12 from a block 11 of single crystalline silicon. It is known in the prior art that the etching rate of single crystalline silicon in anisotropic etching solutions is greatest for the (100) orientation, is lower for the (110) orientation and is least for the (111) orientation. A suitable chemical etching procedure for the foregoing is presented in the Journal of the Electrochemical Society, Vol. 114, page 965 et seq., 1967. The jet nozzle design 10 of FIGS. 1A and 1B comprises a silicon substrate 11 of (100) orientation into which a $p^+$ layer 14 is established on the jet nozzle orifice side 16. The pyramidal opening 18 is established by a chemical etching procedure which etches the silicon block 11 preferentially on the (100) plane and results in a structure with a set of four Si (111) planes as sides 20-1, 20-2, 20-3, 20-4 of the pyramidal shaped opening 18 down to the base 22 which establishes one face of the membrane 24 at the jet orifice 12. When the jet nozzle design of FIGS. 1A and 1B is fabricated in accordance with the disclosure of the noted copending application Ser. No. 537,799, the chemical etching procedure thereof utilizes the $p^+$ doping at layer 14 to provide a flat base 22 to the pyramidal opening, and by appropriate masking and appropriate chemical etching the nozzle orifice 12 is then formed in the membrane 24.

Electric-field synchronization of a fluid jet stream exiting from a nozzle orifice has been suggested in the prior art. Further, prior art book *Field-Coupled Surface Waves*, by J. R. Melcher, pages 131–135, MIT Press 1963; and article "Experiments on Liquid Jet Instability" by E. F. Goedde et al., J. Fluid Mech (1970), vol. 40, part 3, pp. 495–511, published in Great Britain, describe droplet formation in a jet stream by coupling a variable voltage thereto electrically.

Figure 1C:
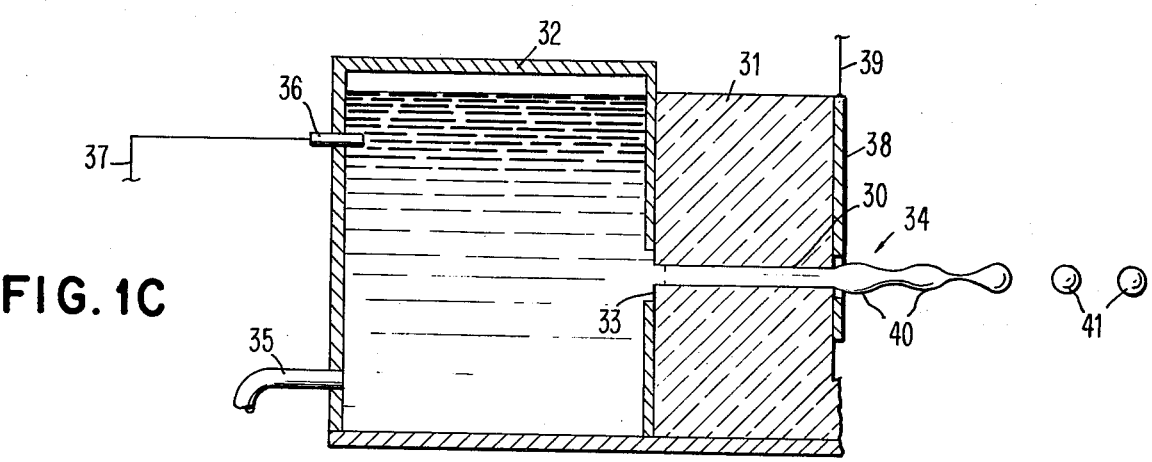
FIG. 1C is a line drawing illustrating a prior suggestion for producing drops in a jet stream by using an electrode formed around an orifice to which a series of electrical voltage pulses are applied.

FIG. 1C illustrates a prior suggestion (as presented in copending and commonly assigned application Ser. No. 427,193 filed Dec. 21, 1973 by R. A. Toupin) now U.S. Patent 3,893,623 for producing drops in an ink jet stream by using an electrode formed around an orifice to which a series of electrical voltage pulses is applied. The description of FIG. 1C which follows will incorporate a paraphrase of relevant descriptive language concerning the related of said copending application Ser. No. 427,193 now U.S. Patent 3,893,623 as presented therein. Nozzle 30 in quartz block 31 communicates with manifold 32 through opening 33. A continuous stream of ink 34 is ejected from nozzle 30. Ink under pressure is supplied to manifold 32 via line 35. Pressure sensor 36 via line 37 controls a pump, not shown in FIG. 1C, to regulate pressure in manifold 32. An electrode 38 is formed around the exit orifice of nozzle 30. A series of voltage pulses, not shown in FIG. 1C, applied to control wire 39 which is connected to electrode 38 from a control circuit, not shown in FIG. 1C, cause perturbations 40 of the amplitude of ink jet stream 34 which result in the formation of drops 41.

The prior art has not disclosed the monolithic technology provided in accordance with the principles of this invention based on a silicon crystalline region for a jet nozzle structure with integral components for electrohydrodynamic drop synchronization. Thus, the developments in the prior art are only precursor in nature to the practice of this invention.

Figure 2:
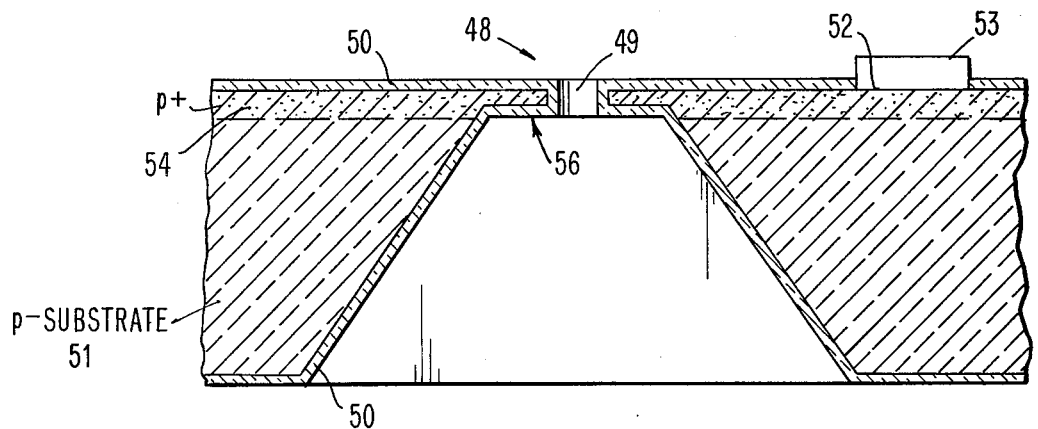
FIG. 2 is a schematic representation of a jet nozzle structure in accordance with the principles of this invention wherein an electrode for establishing the appropriate electric field for electrohydrodynamic drop synchronization of a jet stream emitted from said nozzle structure is achieved by a $p^+$ layer at the surface of said block. The $p^+$ layer may beneficially be utilized during the fabrication of the basic jet nozzle design of FIGS. 1A and 1B. There is included a representation of the circuitry for achieving the synchronization signal established integral with the silicon block in accordance with integrated semiconductor circuit processing procedures.

There is illustrated in FIG. 2 an embodiment 48 of the jet nozzle structure with associated components provided by the practice of this invention. There is included a jet nozzle design according to the premise described hereinbefore with regard to FIGS. 1A and 1B. In order to obtain an integrated jet nozzle structure 48 with orifice 49 shown in FIG. 2 which can provide electrohydrodynamic drop synchronization of a jet stream from the jet nozzle design 10 of FIGS. 1A and 1B, an insulator layer 50 of $SiO_2$ is established on the surface thereof, i.e., on the pyramidal opening 18, membrane 24 and exiting surface 16. The silicon dioxide layer 50 may conveniently be established either by oxidizing silicon jet nozzle design 10 of FIGS. 1A and 1B, or by independently depositing the layer of $SiO_2$, or by establishing another suitable insulating layer, upon the Si jet nozzle design 10 of FIGS. 1A and 1B. An opening 52 is obtained in the insulator layer 50 to the surface of the underlying silicon $p^+$ layer 54 for making electrical contact thereto.

It has been determined for the practice of this invention that the basic jet nozzle design of FIGS. 1A and 1B is benefitted by the silicon dioxide layer 50 for an ink jet stream. The silicon dioxide layer 50 not only participates in establishing the appropriate electrohydrodynamic drop synchronization in the exiting jet stream but also is especially beneficial with some fluids for preventing corrosion of the underlying silicon substrate. In order to utilize the prior jet nozzle design presented in FIGS. 1A and 1B for electrical drop synchronization of a jet stream, it is necessary to insulate the jet stream from the silicon substrate by insulating the entirety of silicon wafer which comes in contact with the jet liquid. For a window membrane 56 in FIG. 2 having total thickness approximately in the range of 1 to 10 micrometers, it has been determined that an oxide layer 50 of approximately ½ micrometer thickness works satisfactorily. Exemplary electric-field drop synchronization has been achieved with the jet nozzle structure of FIG. 2 for the practice of this invention with an oscillating drive signal having frequency 167.7 khz, amplitude 60 volts peak-to-peak, and a jet velocity of 620 inches/sec.

Figure 3:
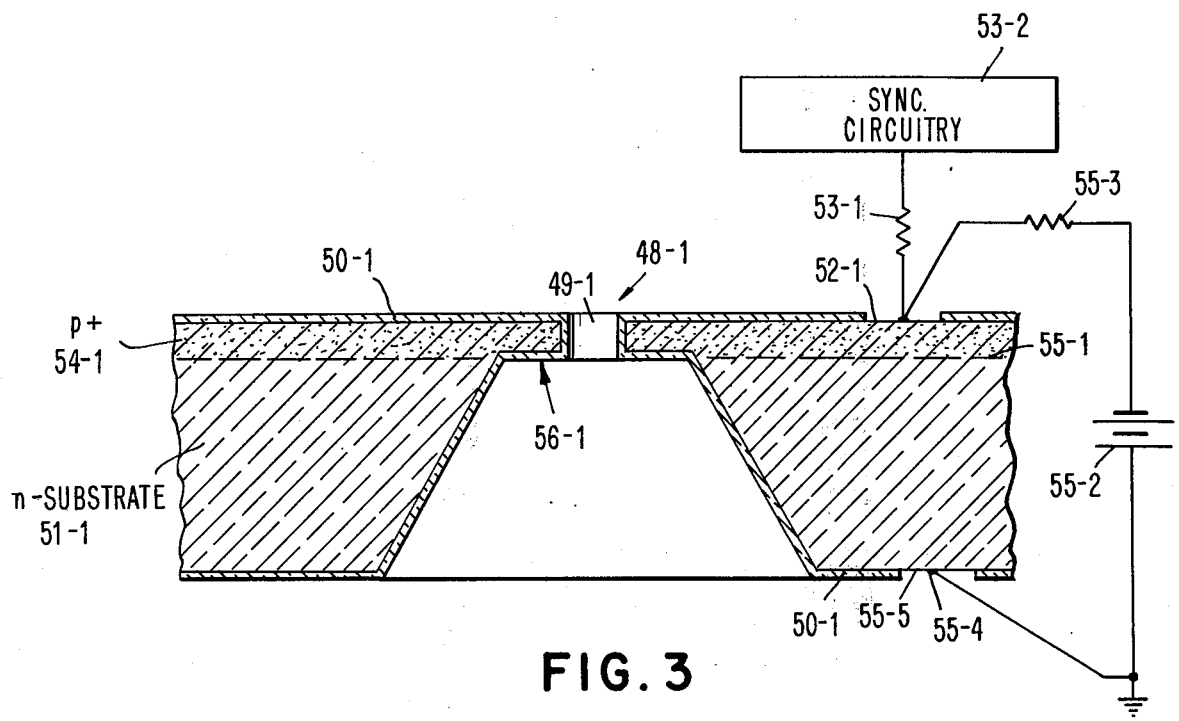
FIG. 3 is a schematic representation of a jet nozzle structure in accordance with the principles of this invention for electrical drop synchronization which includes the jet nozzle design illustrated in FIGS. 1A and 1B. There is shown the application of a reverse bias voltage to the synchronizing electrode so that the electric field provided by the $p^+$ layer electrode is more closely constrained to be near the surface of the silicon block near the exit of the jet. This is accomplished by making the basic silicon block as $n$-type silicon.

The jet nozzle design 10 of FIGS. 1A and 1B is fabricated from a $p$-type silicon substrate 11 which is changed close to the jet exit surface to $p^+$-type by diffusion of a higher concentration of $p$-type dopant thereat for purpose of fabrication of the pyramidal opening 18 and orifice 12. In order that the synchronizing electric field in the exemplary embodiment of the jet nozzle structure of FIG. 3 be more closely confined to the orifice 49-1 and that there be a stronger fringing field on the exit side of the jet nozzle 48-1, the substrate 51-1 may be made of $n$-type silicon and the diode junction shown for convenience as interface 55-1 in FIG. 3 is back biased. A voltage source 55-2 is connected to a $p^+$ layer 54-1 at contact window 52-1 via resistor 55-3 and to the n-type substrate 51-1 at contact point 55-4 in another window 55-5 established through the insulation layer 50-1 on the opposite surface of the silicon substrate 51-1.

Alternatively, considering the exemplary embodiment of a jet nozzle structure shown in FIG. 3, the substrate 51-1 may be p-type silicon as was the case for FIGS. 1A and 1B. The $p^+$ surface layer 14 may then be converted to $n^+$ by appropriate doping.

Synchronization and Formation of Droplets in a Jet Stream

Figure 4:
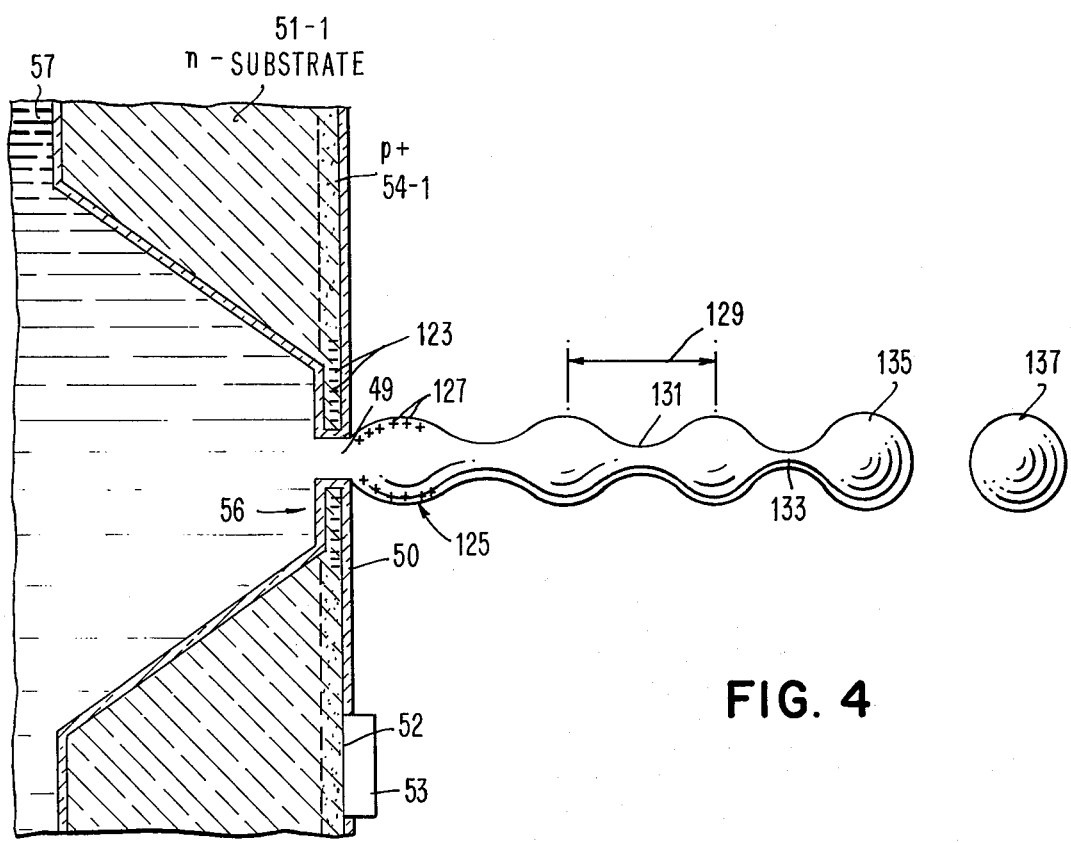
FIG. 4 is an artistic rendition of the physical principles by which the electric field obtained with the structure of FIG. 3 is established proximate to the jet nozzle orifice. It shows how the interaction of the electric field and the jet stream induces electrohydrodynamic instabilities in the jet stream which ultimately cause the stream to be broken up into drops which are achieved synchronously.
Figure 5:
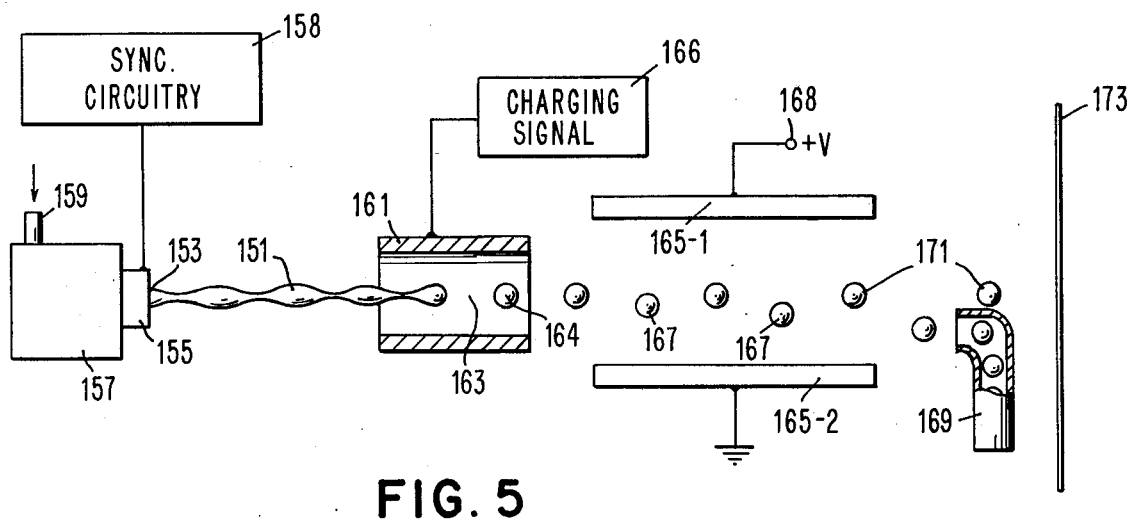
FIG. 5 is a schematic representation of an ink jet printing system in which there is incorporated the jet nozzle structure of FIG. 2 in accordance with the principles of this invention. It shows how the jet nozzle structure provides the synchronized drops and how the drops are controlled for selective printing on a target paper.

A discussion will be now presented concerning the physics of jet drop formation and ink jet printing therewith with reference to FIGS. 3, 4 and 5 in order that the principles of this invention be better appreciated as concerns the advancement in the art achieved by the practice thereof.

FIG. 3 shows a jet nozzle structure and integrated synchronization electrode structure. The nozzle is fabricated in the n-type silicon substrate 51-1. The synchronization structure is formed by the $p^+$ diffused layer 54-1. The synchronization signal is applied to the $p^+$ diffused layer via resistor 53-1 by synchronization circuitry 53-2 which may be external or may be fabricated integral with the silicon substrate 51-1. The synchronization signal is an alternating voltage which is applied at the frequency of drop formation or half the frequency of drop formation. The alternating signal is superimposed upon a direct voltage which is arranged so as to cause the junction 55-1 between the $p^+$ diffused layer 54-1 and the substrate 51-1 which is $n$-type silicon to be reverse biased. This confines the synchronization signal to the $p^+$ layer 54-1.

The physical operation of the electrohydrodynamic synchronization structure of FIG. 3 will be appreciated with reference to FIG. 4 which incorporates a jet nozzle structure and circuitry according to the embodiment hereof illustrated by FIG. 3. In order to achieve synchronized formation of drops from an ink jet, a periodic perturbation must be applied to the ink jet as it emerges from the jet nozzle structure. If the wavelength of the perturbation is greater than the number $\pi$ times the jet diameter, according to theoretical fluid dynamics the perturbation will be amplified. As the perturbation increases in amplitude, a point will be reached downstream at which the jet stream periodically necks off and droplets are formed.

An oscillating synchronization voltage is applied to the synchronization layer 54-1 of FIG. 4. A voltage applied to the electrode causes temporally a charge 123, shown as negative, to occur as a sheet of charge at the surface of the $p^+$ layer 54-1. This sheet of charge 123 induces an additional charge 127 of opposite sign in the ink jet column 125. For exemplary purpose in the discussion of the present invention, the jet stream will be considered to be conductive. A force is exerted between the primary negative charge 123 and the positive charge 127 which force is proportional to the square of the applied voltage. This force causes the jet stream to expand as it emerges from the jet nozzle orifice 49 and cause a swelling in the diameter of the jet stream. At a later point in time, the periodic synchronization voltage goes through zero. At that time, there is no charge on the electrode 54-1 and no charge is established on the surface of the jet stream, and swelling of the jet stream does not occur. Accordingly, there is a periodic swelling and non-swelling of the jet stream which travels downstream as a wave motion. The wavelength of the perturbation, which is the distance 129 between swells of the wave motion, is given by the velocity of the jet stream divided by the frequency of the perturbation of the jet. This may be equal to or twice the frequency of the applied voltage depending on the nature of the applied synchronization signal.

Ulimately, the perturbation becomes large enough in amplitude that the neck 131 of the perturbation reaches a critical point 133 where the diameter of the jet stream effectively is zero. Beyond this point, the nascent droplet 135 separates from the jet stream and becomes a droplet 137. The size, the shape, the separation, the rate of occurrence and the distance from the nozzle exit orifice 49 of the droplets are substantially constant for a stream of drops synchronized in accordance with the principles of this invention. Because constancy of these factors is required for accurate ink jet printing, practice of this invention is especially advantageous therefor.

Ink Jet Printing

The several embodiments of the monolithic jet nozzle structure provided for the practice of this invention are especially advantageous for ink jet printing. In FIG. 5 there is presented a schematic diagram of an ink jet printing system showing how a jet stream is modified to obtain synchronously formed droplets and how those droplets are selectively distributed to a paper target for printing thereon or to a gutter for recycling to the ink supply.

Referring now to FIG. 5, a jet column or stream of ink 151 emerges from exit orifice 153 of nozzle 155 which is connected to a fluid source manifold 157. The fluid manifold 157 is fed by an ink input tube 159 at a constant pressure which forces the ink through the nozzle thereby forming the ink jet. The ink jet is then caused to be broken up into a stream of synchronized drops by the application of a synchronizing voltage from circuitry 158 to a synchronization electrode which is an integral part of the exit orifice denoted 153 as described previously for FIGS. 2 and 3. A charging electrode 161 is positioned near the point 163 of drop formation. A voltage 166 supplied to the charging electrode 161 draws charge out to the tip of the jet. As the drop 164 breaks off from the jet 151, it carries with it a charge proportional to the voltage applied to the charging electrode 161. The droplets then pass into a region of high field intensity created by a pair of deflection plates 165-1 and 165-2, across which a high voltage 168 is maintained. The electric field is transverse to the direction of drop motion and causes charged drops to be deflected by an amount proportional to their charge and allows uncharged drops to pass through undeflected.

The charged drops 167 are deflected into a catcher or gutter 169 and from there they are recirculated back through a pump and appropriate filtering devices directly into the ink input 159. The uncharged drops 171 pass undeflected through the deflection plates 165-1 and 165-2 and strike target paper 173. Since practical embodiments of such an ink jet printer often utilize an array of jets, the constancy of the breakoff length for droplet 164 formation is critical for accurate operation of the ink jet printer of FIG. 5. An important feature of electric drop synchronization is its freedom from non-uniformities associated with acoustic resonance. It provides through the practice of this invention uniform drop formation length as required for accurate printing on target paper 173.

The physical principle of the electrical drop synchronization will now be described. The jet fluid is introduced into the initial opening of the nozzle under pressure. The ink is a sufficient electrical conductor that it acts as one electrode of a capacitor arrangement wherein the silicon dioxide is the dielectric layer and the $p^+$ layer is the other electrode.

As the jet fluid is in intimate contact with the orifice of the nozzle at the region of closest approach between the fluid and the $p^+$ layer electrode, the electrical force is unable to deform the jet stream. However, as the jet stream emerges from the nozzle on the exit side, the fringing electricc field provides sufficient electrical force to cause the stream transiently to expand close to the exit of the orifice and to introduce the synchronizing perturbation necessary for causing the drops which form later in time downstream to have a periodicity which is closely related to the frequency of the oscillating drive signal.

The nature of a jet stream emitted from an orifice is such that ultimately it will fragment into droplets. However, there is a random distribution as to the origin of the drops, the size of the drops and the drop spacing. For controlled utilization of jet stream drops, a close control of the formation of the drops is required in order that certain drops will be established on the target and certain drops will be dispersed therefrom. The initial droplet develops both temporally and spatially in a manner that can be controllably related to the periodicity and amplitude of the applied oscillating drive signal. The periodic perturbating force established at the jet stream proximate to the fringing electric field causes the jet stream to expand periodically into the spatial region along the surface of the insulator layer away from the jet stream. The instability in the stream ultimately causes the stream to break up into the droplets which because of their surface tension rapidly become spherical in character.

It is a principle of this invention to establish the electric field which causes displacement of the jet as close to the jet nozzle orifice as is compatible with achieving sufficient displacement. It is important that a strong coupling be achieved to the jet stream in order to have a large signal-to-noise ratio.

For a conductive jet stream, the jet liquid must be insulated from the nozzle. For a dielectric jet stream, an electrode strucure proximate to the jet stream can act upon charges induced upon the jet by one of several possible means to perturb the stream to achieve electrohydrodynamic drop synchronization.

Practice of the Invention

Figure 6A:
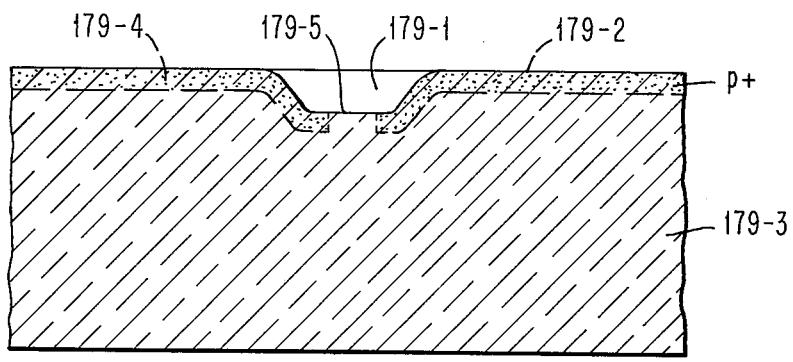
Figure 6B:
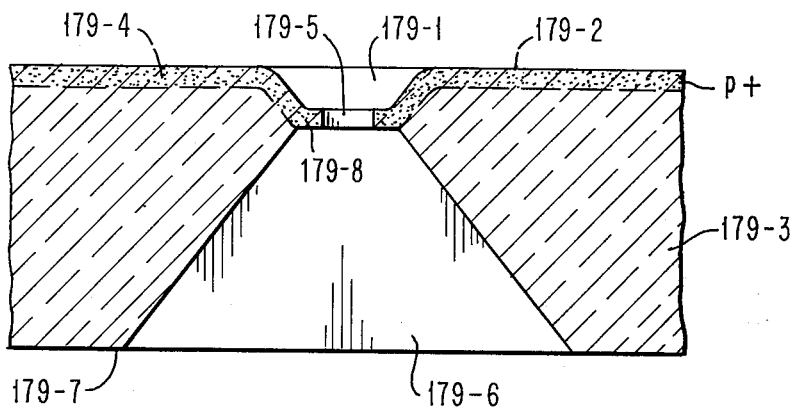
Figure 6C:
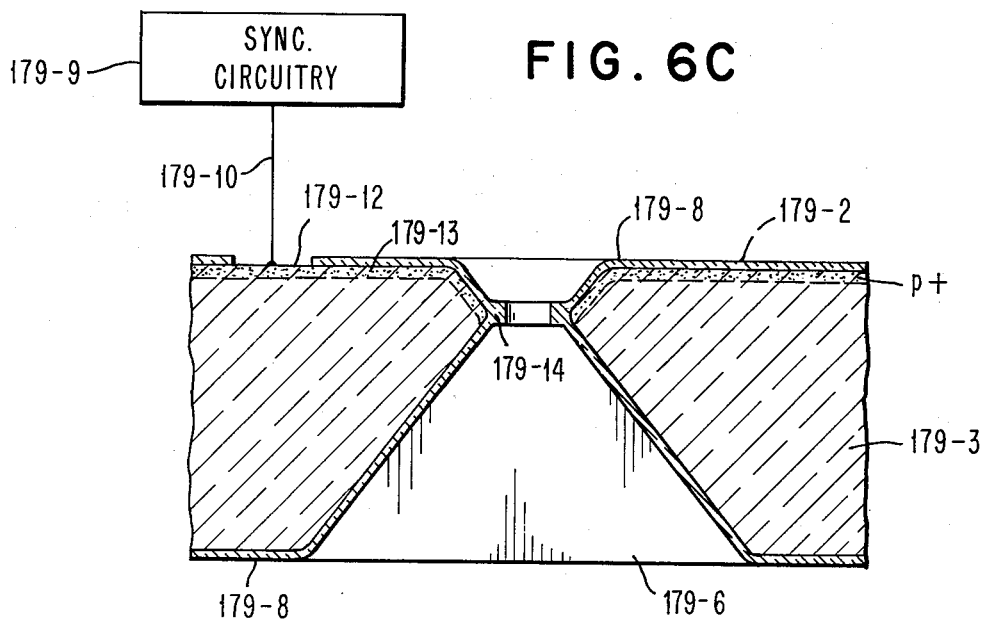
FIG. 6C is a schematic representation of an exemplary embodiment of this invention wherein a $p^+$ electrode layer is established downstream from the jet nozzle orifice so that the electric field for electrohydrodynamic deformation of the jet stream is accomplished more intensely in the spatial region where the jet stream can preferentially deform.

The embodiment illustrated by FIG. 6C obtains additional control on the relationship between the applied electric field and the displacement of the jet stream achieved thereby.

FIGS. 6A and 6B show preliminary fabrication steps for the jet nozzle structure embodiment of this invention illustrated in FIG. 6C. A small recess 179-1 is chemically etched into the surface 179-2 of single crystalline silicon wafer 179-3. Thereafter, $p^+$ layer 179-4 is diffused into the surface 179-2 except for a portion thereof 179-5 which is masked during said diffusion. Then, as shown in FIG. 6B, the pyramidal opening 179-6 is chemically etched on the entrance side 179-7 of single crystalline wafer 179-3 and the orifice region 179-5 is concomitantly etched because of the absence of $p^+$ layer thereat. Thereafter, the embodiment as shown in FIG. 6C is completed in the manner now to be described.

An insulation layer 179-8 is then established preferably by oxidizing said prepared wafer of FIG. 6B in an oxidizing ambient. Generally, when single crystalline silicon is oxidized, the resultant oxide layer is about one-half above the original surface and one-half below it. As a result of oxidation, the $p^+$ membrane 179-8 in FIG. 6B is converted to a silicon dioxide membrane 179-14 in FIG. 6C. The unoxidized portion of the $p^+$ diffused layer 179-13 is approximately half the thickness of the original $p^+$ diffused layer 179-4 and serves as the synchronization electrode. Synchronizing circuitry 179-9 is established as integrated semiconductor circuitry on silicon wafer 179-3. Connector 179-10 connects circuitry 179-9 to $p^+$ layer 179-4 at opening 179-12 in insulation layer 179-8.

Figure 7:
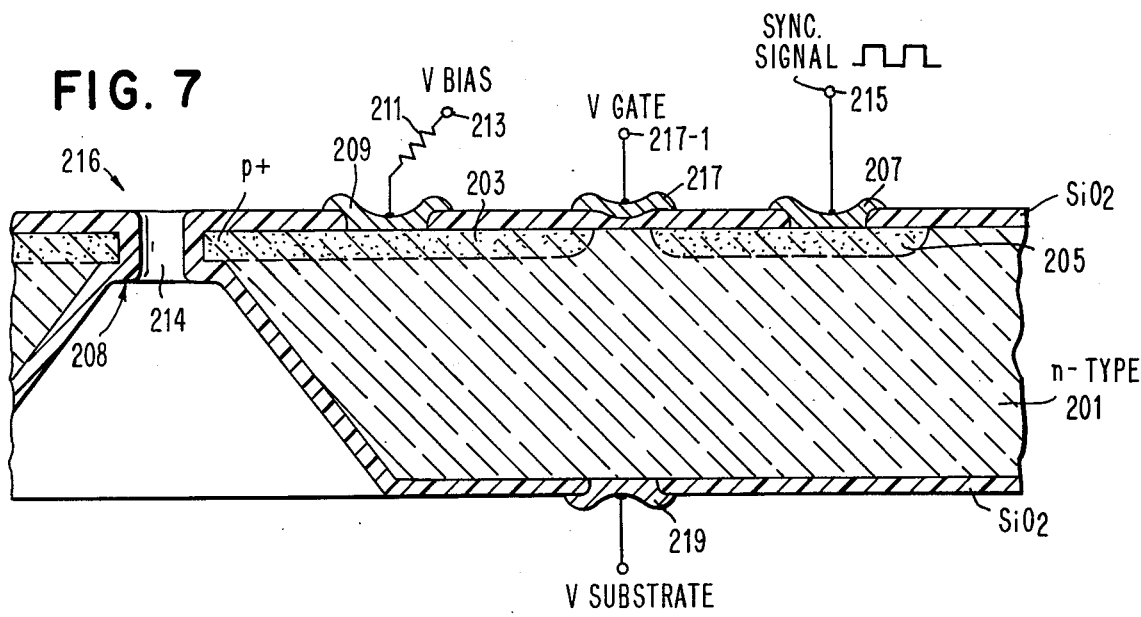
FIG. 7 is a schematic representation of a nozzle structure integrated with a field effect transistor configuration for selectively establishing the electrohydrodynamic perturbation of the jet stream from a jet nozzle structure in accordance with the principles of this invention.

The integrated semiconductor circuit structure of FIG. 7 is provided in order to have flexibility and control of the electrohydrodynamic drop synchronization in one or more additional jet nozzles. The exemplary transistor structure incorporated with the jet nozzle for the practice of this invention as shown in FIG. 7 comprises a basic structure comparable to that of FIG. 3 wherein the several electrodes required for the operation of a field effect transistor are incorporated. For exemplary purpose, the substrate is shown as n-type silicon and the electrode layer for establishing the electric field for electrohydrodynamic drop synchronization is shown as a $p^+$ layer. However, it will be understood that the substrate may be p-type and the diffused layer may be $n^+$-type.

FIG. 7 shows the silicon substrate 201 with a jet nozzle structure as presented in FIG. 3. The silicon substrate 201 has in it $p^+$-type diffused regions 205 and 203 which form the source and drain regions, respectively, of a field effect transistor. The diffused region 203 is part of a nozzle 216 similar to that indicated in FIG. 3 with the orifice 214 formed in the membrane 208. The source region of the field effect transistor 205 is contacted by a metallization layer 207 to which a signal is applied. The drain region 203 is connected to a metal contact 209 which connects via load resistor 211 to a source of bias voltage 213. A square wave synchronizing signal 215 is applied to the source electrode 207 and therefrom to the drain region and, consequently, to the synchronizing electrode when the gate 217 is activated. The fourth terminal of the field effect transistor of the FIG. 7 device is the substrate contact 219.

An exemplary operation of the transistor electronic structure of FIG. 7 will now be described. The square wave source signal 215 has the desired frequency for droplet formation. The square wave 215 has two levels, one being zero volts and one being −10 volts. The substrate is biased at 0 volts. These are exemplary typical values. The bias voltage 213 is applied through the load resistor 211 to the drain region and is typically −10 volts. If the gate voltage 217-1 is set at −10 volts, a conducting path is established between the source region 205 and the drain region 203. The source signal and its variations are effectively applied to the synchronization electrode 203.

When the voltage 215 is at −10 volts and the gate voltage 217-1 is at −10 volts, the transistor is conducting and the drain region 203 is then also at −10 volts. If the gate 217 is at −10 volts when the source signal goes to zero volts, the drain voltage goes approximately to zero volts. Hence, when the transistor is in the conducting state, the signal applied to the synchronization electrode 203 is approximately the same as the source signal. When the gate electrode 217 is altered from −10 volts back to zero volts, the synchronization signal is not applied to the synchronization electrode. The transistor then goes into the non-conducting state, and a synchronizing voltage signal does not appear on the synchronization electrode 203. When the gate electrode 217 is biased in the zero voltage condition, a direct voltage equal to the bias voltage 213, for example −10 volts, is applied to the synchronization electrode. However, this direct voltage has substantially no effect on the jet stream. The transistor can also be operated as an analog control wherein intermediate values of the gate voltage lying between zero and −10 volts can give rise to synchronization signal of varying amplitude between zero and 10 volts.

The making of synchronizing structures monolithically on a silicon substrate is a beneficial feature for the practice of this invention. In addition to accomplishing the synchronization, control circuitry can be integrated on the same substrate. For certain ink jet device configurations, it is desirable to be able to take an array of jets and control the synchronization signal applied to each one; that is, the $n$th jet might be synchronized at a particular point in time, and the (n + 1)th jet might be unsynchronized or synchronized differently. If the system involves a large array of jets, it is impractical if not impossible to implement synchronization of drop formation by the practice of the prior art because of the large number of interconnections between the synchronization structures and the drive circuits if merely the teachings of the prior art were followed.

Figure 8:
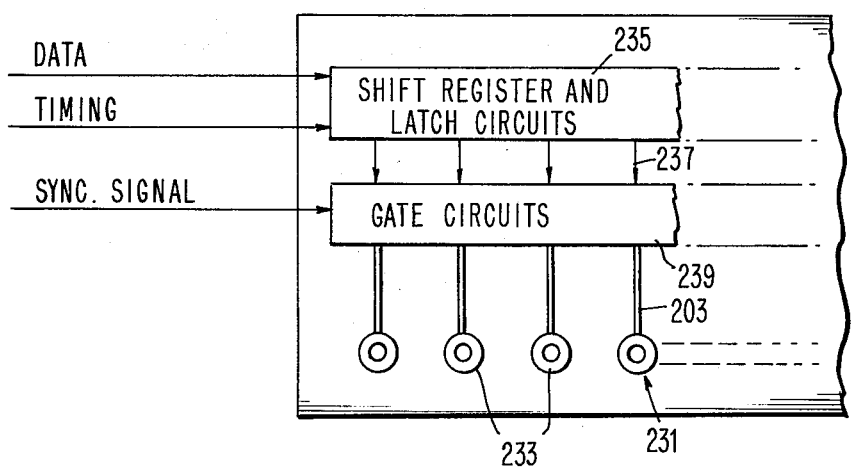
FIG. 8 is a schematic representation of an integrated jet nozzle structure incorporating integrated semiconductor circuitry wherein a plurality of jet nozzles in accordance with the principles of this invention are cooperatively related in a unitary silicon block together with the appropriate electronic circuits for achieving both independently and cooperatively electrical drop synchronization for jets issuing from one or more of the nozzles so that jet ink printing can be accomplished from said nozzles.

By forming the jet nozzle structure and the synchronization circuitry integral with a silicon wafer, the individual jets may be addressed separately and controlled separately. This is accomplished with silicon integrated circuit technology as exemplified by FIG. 8. A system is represented by FIG. 8 which utilizes a plurality of field effect transistors established with the same substrate as indicated in FIG. 7. In FIG. 8 there is an array of jet nozzles 231. Each jet nozzle 231 is controlled by a corresponding synchronization electrode 233. Each of the synchronization electrodes is achieved by a diffusion in the silicon substrate and corresponds to the diffused layer 203 of FIG. 7 which was the drain region of the field effect transistor.

As shown in FIG. 7 the synchronization electrode can be connected directly to the drain region of a field effect transistor. By making use of the discussion relating to FIG. 7 and by demonstrating how it is possible to gate on and off the synchronization signal using the field effect transistor indicated thereby, the operation of the system illustrated in FIG. 8 will be understood. Data and timing signals are introduced into a shift register 235 which is a block of circuits and a plurality of interconnected transistors to perform the function of shift register and latches. The data signal is introduced to the shift register 235, and a time multiplex signal is spread out among the various signal channels 237. Timing circuits communicate to signal shift register and latch circuit 235 when to stop shifting and when to hold the incoming signal. For the period of time required, e.g., for one clock cycle of the ink jet printing procedure, the appropriate voltage level is held on the latch circuit 235. That voltage level is applied through each of the individual signal channels 237 to the gate of the individual field effect transistor (FIG. 7) in the block of gate circuits 239. The synchronizing signal is applied to the source region of each of the transisors in the block of gate circuits.

Accordingly, only one input line is required for controlling the application of a synchronization signal selectively to any combination of a plurality of jets. If a non-monolithic and non-silicon structure were used for synchronizing a plurality of related jets, a separate drive circuit would be required for each of the individual synchronization structures with an associated interconnection between the nozzle substrate and the substrate in which the integrated circuits were contained. These connections would have to be made in rather close spacing and would have to exist in a reliable fashion in a corrosive ink environment. By using the monolithic silicon synchronization structure according to the principles of this invention, a small number of external interconnections can drive a large number of jets. This is a unique capability of synchronization with this monolithic silicon structure which is not achievable with any other known system.

Additional Embodiments of the Jet Nozzle Structure of the Invention

Figure 9A:
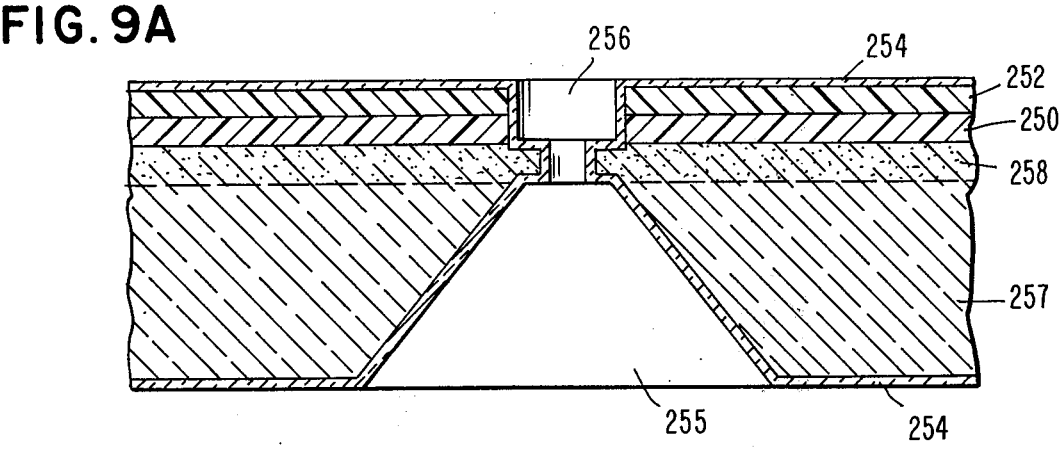
FIGS. 9A and 9B show two exemplary designs for the electrode structure in accordance with the principles of this invention which is incorporated with the jet nozzle design of FIGS. 1A and 1B utilizing single crystalline silicon. The electrode which provides the electric field for displacing the jet stream to cause the electrohydrodynamic instabilities which lead to the synchronized drop formation is an $n^+$ layer which is isolated from the basic jet nozzle design either by use of an $n$-type layer in FIG. 9A or by a dielectric layer in FIG. 9B which may for exemplary purpose be silicon dioxide.
Figure 9B:
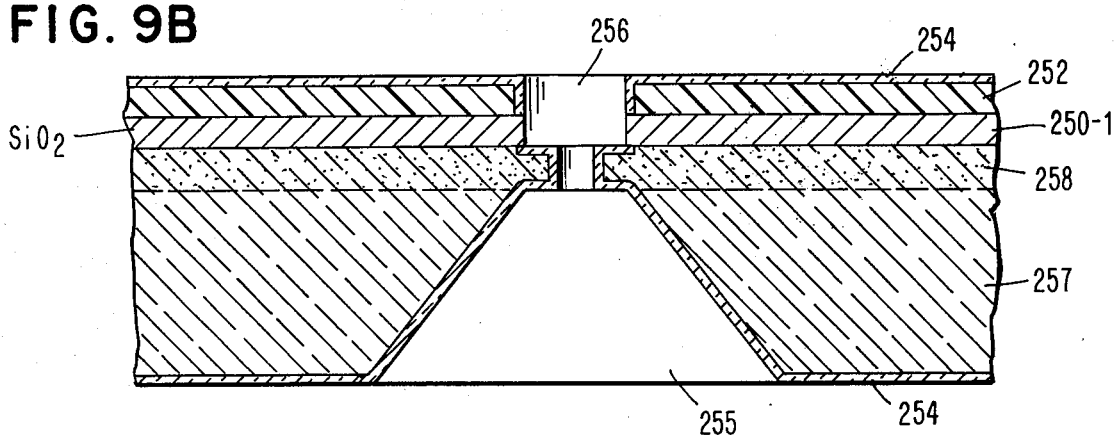

Through FIGS. 9A and 9B two embodiments of this invention are presented which establish electrical drop synchronization at especially controlled locations for optimizing the interactions with the jet stream. In FIG. 9A additional layers are epitaxially grown or otherwise deposited on the silicon substrate of FIG. 2 comprising an n-type layer 250 upon which is grown or deposited an $n^+$ layer 252. The $n^+$ layer comprises the electrode required for establishing the electric field in the exit 256 of the jet nozzle. A silicon dioxide layer 254 is established on the silicon substrate 257 with a $p^+$-type layer 258 therein where there may be contact with the liquid introduced at opening 255. The additionally formed n-type layer 250 and $n^+$-type layer 252 and insulation layer 254 achieve the appropriate electrode structure for electrical drop synchronization in accordance with the principles of this invention. In accordance with the principles of this invention, additional isolation can be achieved by reverse biasing the junction between the $p^+$ layer 258 and the n layer 250.

There is shown in FIG. 9B a comparable jet nozzle structure to that shown in FIG. 9A with the modification of the n-type layer of FIG. 9A being replaced by an oxide SiO$_2$ layer 250-1, although other insulating layers can be used. This achieves an additional electrical isolation of the $n^+$-type layer 252 thereby more closely confining the electric field to the region of choice in the opening 256. For illustrative purpose, in both FIG. 9A and FIG. 9B, standard photolithographic procedures or other means may be used to recess the $n^+$ layer 252 and layer 250 or 250-1 back from the exiting jet in accordance with the discussion of FIG. 6.

Preferred Embodiment of the Jet Nozzle Structure of the Invention

Figure 10A:
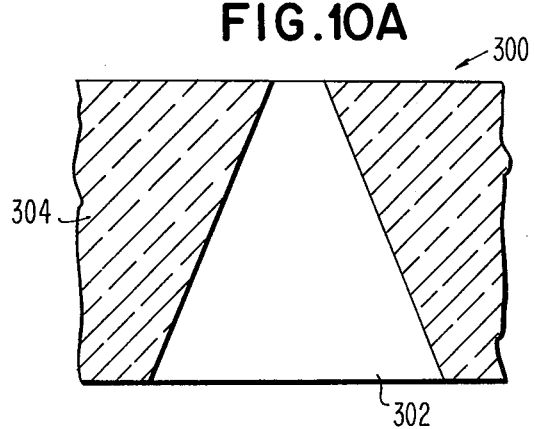
FIGS. 10A and 10B are elevation and plan views respectively of another jet nozzle design based on a single crystalline block of silicon wherein the jet nozzle orifice is approximately rectangular in shape, preferably square. The design is achieved by an etching procedure that accomplishes a pyramidal opening in the silicon block which is especially adaptable for inclusion as the jet nozzle design for the jet nozzle structure in accordance with the principles of this invention.
Figure 10B:
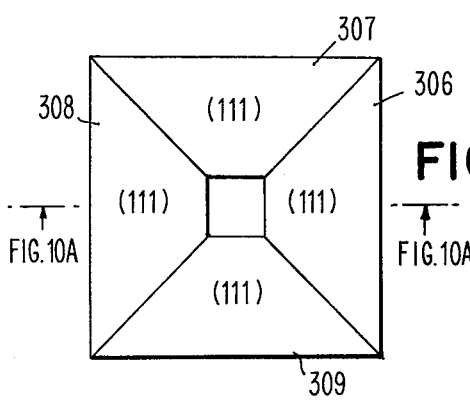
Figure 11:
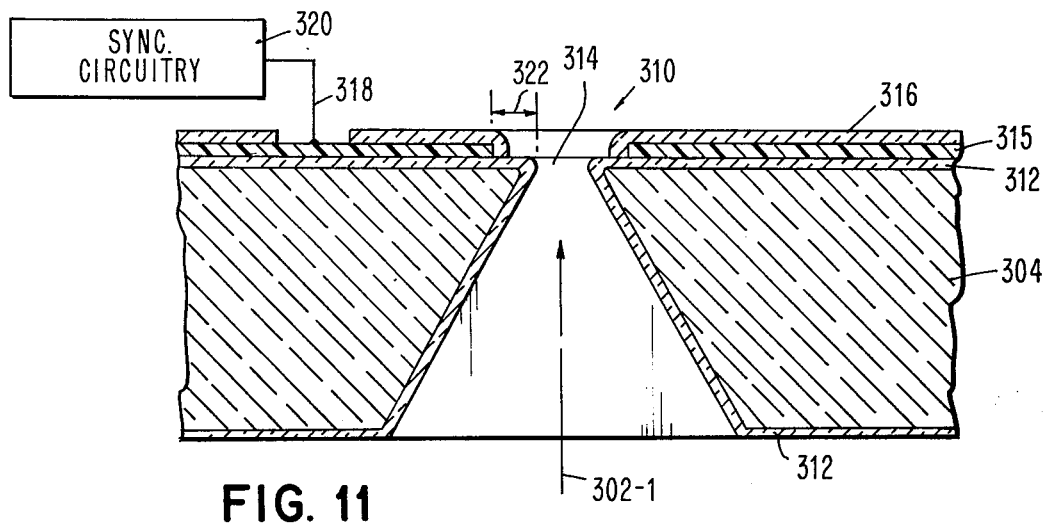
FIG. 11 is a schematic representation showing a jet nozzle structure incorporating the jet nozzle design of FIGS. 10A and 10B wherein the electrode for establishing the electric field for electrohydrodynamic drop synchronization is established on an insulating layer which is established either from the original silicon block or by deposition thereon. The electrode layer is insulated by another insulating layer from the jet stream emitting from the jet nozzle orifice.

FIG. 11 illustrates the preferred embodiment of this invention. FIGS. 10A and 10B show plan and elevation view of a jet nozzle design fabricated entirely of silicon in preparation for an electrode structure and ancillary circuits in accordance with the principles of this invention to be described with regard to FIG. 11. The silicon jet nozzle design 300 of FIG. 10A is comparable to the basic jet nozzle design of FIG. 1A except that it does not have a comparable membrane window and does not have the exemplary $p^+$ layer which is utilized in the particular fabrication of the jet nozzle design of FIGS. 1A and 1B. Pyramidal opening 302 with (111) orientation faces 306 to 309 is established in a single crystalline silicon wafer 304 by a preferential etching process. An exemplary chemical etching procedure is described in an article in the Journal of the Electrochemical Society, Vol. 114, page 965 et seq., 1965, by R. M. Finne and D. L. Klein, although it was not appreciated therein that an etched opening in silicon could be used as an ink jet nozzle. However, a jet nozzle design as exemplified by FIGS. 10A and 10B may be fabricated by other processes known in conventional silicon semiconductor technology. Further, a process for achieving the jet nozzle design of FIGS. 10A and 10B is presented in copending and commonly assigned application Ser. No. 543,600 which is being filed on the same date by E. Bassous et al.

In FIG. 11 there is shown a jet nozzle structure suitable for electrohydrodynamic drop synchronization of a jet stream, e.g., an ink jet stream. A layer 312 of oxide, e.g. SiO₂, is established on the silicon either by deposition or by growth from the underlying silicon substrate 304 in an oxidizing atmosphere, e.g., a procedure utilizing both oxygen and steam, to establish orifice 314. The SiO₂ layer 312 is the support for an $n^+$-type polycrystalline Si layer 315 upon which another layer 316 of SiO₂ is established. Electrical contact to the $n^+$ layer is by conductor 318 from electrohydrodynamic drop synchronization circuitry 320. The requisite electric field is established by electrode 315 in the gap 322 immediately downstream of the orifice 314.

Modification of the jet nozzle structure of FIG. 11 will be apparent by consideration of the modifications of the structure of the figures hereinbefore. The $n^+$ layer of FIG. 11 can be replaced by an Al layer or other suitably conductive layer so that the appropriate electric field can be established in the gap region 322 of the nozzle beyond the exit orifice. As indicated in previously described embodiments, a dielectric layer should be formed over the conducting electrode by suitable means.

Considerations for the Invention

The principles and practice of this invention have been especially characterized in the context of single crystalline Si, which has cubic crystal structure. However, the jet nozzle design, electrode structure, and integrated circuitry can also be fabricated for the practice of this invention with other semiconductors. Illustratively, germanium (Ge) and gallium arsenide (GaAs) which also have cubic crystal structure permit particularly desirable embodiments of this invention. The essential feature of the semiconductor substrate for the practice of this invention is that: the jet nozzle design can be fabricated therein and the electrode structure for electrohydrodynamic perturbation of the exiting jet stream can be established integral with the jet nozzle design. Further, for a monolithic structure for the practice of this invention, it is advantageous that integrated electronic circuitry can be incorporated therewith for providing the signals and controls for ink jet printing by adapting processing procedures known in integrated semiconductor electronic circuit technology.

By selectively utilizing a range of amplitude and phase for the synchronizing signal which is applied to each electrode structure in an array of jet nozzle structures for the practice of this invention, the temporal and spatial formation of droplets in each of the jet streams can be coordinated for beneficial consequences in ink jet printing. For example, mechanical inhomogeneities either in a jet nozzle structure or in the alignment of the members of an array of nozzles can be compensated electrohydrodynamically via controlling the droplet formation in the several jet streams.

The dimensions of a jet nozzle structure and of an array of a plurality of said structures for the practice of this invention may conveniently be as follows:

a. In FIGS. 1A and 1B, the silicon substrate may be of thickness of approximately 7.5 mils; the opening 18 may be about 15 mils, the width of the membrane 24 may be about 5 mils; the thickness of the membrane may be approximately in the range of 1 to 10 micrometers; and the diameter of orifice 12 may be about 1 mil.

b. In FIG. 8 the center-to-center distance between adjacent nozzles 231 may be about 16 mils.

c. Further, for the practice of this invention, an array of orifices can be established in a given membrane of a jet nozzle structure, e.g., in membrane 56 of FIG. 2, and the center-to-center distance between two adjacent orifices could then be about 4 mils.

Exemplary dopants for silicon will be described. The silicon substrate described hereinbefore may be: p-type through p-type dopant boron (B) or aluminum (Al) or gallium (Ga), or n-type through n-type dopant phosphorous (P) or antimony (Sb) or arsenic (As), exemplary concentration of either the p-type or n-type dopant being more than approximately $10^{16}$ to $10^{17}$ atoms per cubic centimeter of silicon. The $p^+$ layer and $n^+$ layer in silicon described hereinbefore have p-type or n-type dopant of concentration in excess of about $10^{18}$ atoms per cubic centimeter of silicon.

The necessity for isolating the jet nozzle design from the liquid which is introduced thereto stems from two considerations. To prevent corrosion of the jet nozzle design, it should be passivated. To effect electrical isolation of the jet nozzle design from the liquid, it should be insulated.

The jet nozzle design utilized in the practice of the invention may conveniently have at least a region of semiconductor at a surface thereof. Illustratively, if a portion of the jet nozzle design is sapphire, i.e., crystalline Al₂O₃, there is a surface region of semiconductor, e.g., of Si, Ge or GaAs on the surface thereof proximate to the exit opening of the orifice. An electrode structure for establishing the electric field proximate to the orifice may then be a doped zone of said semiconductor region. Further, the electronic circuitry for applying the requisite control voltage signal to the electrode structure may then conveniently be established in integral relationship to said surface region of semiconductor by adapting processing procedures known in integrated semiconductor circuit technology.

What is claimed is:

1. A monolithic structure for electrohydrodynamically controlling the formation of droplets in a liquid jet stream exiting from a jet nozzle orifice of at least one jet nozzle structure comprising:
   a jet nozzle design for said jet nozzle structure in a single crystalline semiconductor block;
   an electrode structure integrally incorporated with said jet nozzle design for establishing an electric field proximate to said orifice of said jet nozzle structure; and
   electrical circuit means connected to said electrode structure and having integral and operational relationship to said semiconductor block, for applying a time varying electrical signal to said electrode structure for establishing a time varying electric field proximate to said orifice of said jet nozzle structure, which electrohydrodynamically perturbs a liqud jet stream exiting from said jet nozzle orifice for controllably achieving temporal and spatial formation of droplets in said jet stream.

2. A monolithic structure as set forth in claim 1 wherein: said electrical circuit means includes transistor switching circuitry deposited on said semiconductor block, and including said block in its operational circuitry.

3. A monolithic structure as set forth in claim 1 wherein: there is included an array of a plurality of said jet nozzle structures, each with a respective said jet nozzle design and a respective said electrode structure and a respective said electrical circuit means, which selectively establishes said respective time varying electric field at each said orifice of said array.

4. A monolithic structure as set forth in claim 1 wherein: said electrical circuit means establishes said time varying field as an oscillating field with a given periodicity, and the formation of said droplets in said jet stream is achieved synchronously with said oscillations of said electric field.

5. A monolithic structure as set forth in claim 1 wherein both said electrode structure and said jet nozzle design have electrical insulation means between them and said exiting jet stream.

6. A monolithic structure as set forth in claim 1 wherein said electrode structure is a doped region of polycrystalline silicon.

7. A monolithic structure as set forth in claim 1 wherein said jet nozzle design has thereon a coating to isolate it from said jet liquid.

8. A monolithic structure as set forth in claim 7 wherein said coating is an electrical insulation layer.

9. A monolithic structure as set forth in claim 1 wherein: said semiconductor is selected from the group consisting of silicon, germanium, and gallium arsenide.

10. A monolithic structure as set forth in claim 9 wherein said semiconductor is silicon.

11. A monolithic structure as set forth in claim 9 wherein a silicon dioxide insulation layer electrically insulates said jet nozzle design from said jet liquid.

12. A device including at least one jet nozzle structure for electrohydrodynamic control of drop formation in a liquid jet stream exiting from an orifice of said jet nozzle structure which comprises:
  a jet nozzle design in a substrate of single crystalline semiconductor; and
  electrode structure means with integral relationship to said jet nozzle design and electrically insulated from said jet stream, for establishing an electric field proximate to said orifice downstream thereof for electrohydrodynamically controlling drop formation in said jet stream both temporally and spatially.

13. A device as set forth in claim 12 wherein: there is included an array of a plurality of said jet nozzle structures, each with a respective said jet nozzle design and with a respective said electrode structure means, for electrohydrodynamically controlling drop formation in the respective said jet stream both temporally and spatially.

14. Device as set forth in claim 12 wherein
  said jet nozzle design includes an opening in said substrate, and
  said electrode structure means includes an electrode layer gapped from said orifice and insulated from both said jet nozzle design and from said jet stream.

15. A device as set forth in claim 12 wherein: there is isolation means integrally bonded to the surface of said jet nozzle design at the liquid contacting portion thereof.

16. A device as set forth in claim 15 wherein said isolation means is electrical insulation means.

17. Device as set forth in claim 12 wherein said opening is a pyramidal opening.

18. Device as set forth in claim 17 wherein
  said substrate is single crystalline silicon,
  said pyramidal opening is defined by four (111) orientation silicon surface planes, and
  said electrode is insulated from said silicon substrate by a layer of electrical insulation thereon.

19. Device as set forth in claim 18 wherein said electrical insulation layer comprises $SiO_2$.

20. Device as set forth in claim 18 wherein
  said electrode is $n+$ polycrystalline silicon, and
  said electrode is insulated from said liquid jet stream by a layer of electrical insulation on said electrode.

21. Device as set forth in claim 20 wherein said electrical insulation layer comprises $SiO_2$.

22. A device as set forth in claim 12 wherein: said semiconductor is selected from the group consisting of silicon, germanium, and gallium arsenide.

23. A device as set forth in claim 22 wherein said semiconductor is silicon.

24. A device as set forth in claim 23 wherein: said electrode structure means includes a doped region in said silicon substrate selected from the group consisting of $p^+$ silicon and $n^+$ silicon, and having higher conductivity than said substrate.

25. A device as set forth in claim 24 wherein: said doped electrode region in said silicon substrate and said substrate are of opposite conductivity types, and said doped region in said silicon substrate and said substrate establish a $p$-$n$ junction therebetween.

26. A device as set forth in claim 23 wherein said jet nozzle design has an opening defined by four (111) silicon surface planes.

27. A device as set forth in claim 26 wherein said orifice of said jet nozzle design is approximately rectangular.

28. A device as set forth in claim 26 wherein: said opening of said jet nozzle design includes a silicon membrane in said opening and at least one said orifice in said membrane.

29. A device as set forth in claim 28 wherein said membrane has a thickness approximately in the range of 1 micrometer to 10 micrometers.

30. An ink jet printing system incorporating at least one jet nozzle orifice for a liquid ink jet stream exiting therefrom which comprises:
  a jet nozzle structure including a jet nozzle design in a single crystalline semiconductor substrate;
  an electrical insulation layer on said semiconductor of said jet nozzle design where it is traversed in contacting relationship by said liquid;
  electrode structure means integral with said jet nozzle structure and insulated from said jet stream exiting from said orifice, for electrohydrodynamically perturbing said jet stream for controlling formation of droplets in said stream temporally and spatially; and
  ink jet printing means for ink jet printing with said droplets.

31. The jet printing means as set forth in claim 30 wherein said ink jet printing means includes:
  means for electrically charging said droplets in a jet stream; and
  means for deflecting said droplets selectively so that particular droplets are utilized for printing on a target.

32. An ink jet printing system as set forth in claim 30 which includes an array of a plurality of said jet nozzle structures in said substrate, and wherein said ink jet printing means utilizes in a coordinated manner said droplets formed in each of said jet streams for said ink jet printing, and including a respective said electrical insulation layer and a respective said electrode structure means.

33. An ink jet printing system as set forth in claim 32 wherein said controlling of said information of droplets in each said jet stream is achieved either individually or collectively.

34. Ink jet printing system as set forth in claim 30 wherein: said semiconductor is selected from the group consisting of silicon, germanium, and gallium arsenide.

35. Ink jet printing system as set forth in claim 34 wherein said semiconductor is silicon.

36. A monolithic structure for electrohydrodynamically controlling the formation of droplets in a liquid jet stream exiting from a jet nozzle orifice of at least one jet nozzle structure comprising:
a jet nozzle design for said jet nozzle structure in a block having at least a region of semiconductor at a surface thereof;
an electrode structure integrally incorporated with said jet nozzle design for establishing an electric field proximate to said orifice of said jet nozzle structure; and
electrical circuit means connected to said electrode structure and having integral and operational relationship to said semiconductor region, for applying a time varying electrical signal to said electrode structure for establishing a time varying electric field proximate to said orifice of said jet nozzle structure, which electrohydrodynamically perturbs a liquid jet stream exiting from said jet nozzle orifice for controllably achieving temporal and spatial formation of droplets in said jet stream.

37. A monolithic structure as set forth in claim 36 wherein: there is included an array of a plurality of said jet nozzle structures, each with a respective said jet nozzle design and a respective said electrode structure and a respective said electrical circuit means, which selectively establishes said respective time varying electric field at each said orifice of said array.

38. A monolithic structure as set forth in claim 36 wherein: said electrical circuit means includes transistor switching circuitry deposited on said semiconductor region, and including said region in its operational circuitry.

39. A monolithic structure as set forth in claim 36 wherein: said semiconductor is selected from the group consisting of silicon, germanium, and gallium arsenide.

40. A monolithic structure as set forth in claim 39 wherein said semiconductor is crystalline.

41. A device including at least one jet nozzle structure for electrohydrodynamic control of drop formation in a liquid jet stream exiting from an orifice of said jet nozzle structure which comprises:
a jet nozzle design in a substrate having at least a region of semiconductor at a surface thereof; and
electrode structure means with integral relationship to said jet nozzle design and electrically insulated from said jet stream, for establishing an electric field proximate to said orifice downstream thereof for electrohydrodynamically controlling drop formation in said jet stream both temporally and spatially.

42. A device as set forth in claim 41 wherein: there is included an array of a plurality of said jet nozzle structures, each with a respective said jet nozzle design and with a respective said electrode structure means, for electrohydrodynamically controlling drop formation in the respective said jet stream both temporally and spatially.

43. Device as set forth in claim 41 wherein
said jet nozzle design includes an opening in said substrate, and
said electrode structure means includes an electrode layer gapped from said orifice and insulated from said jet nozzle design and from said jet stream.

44. A jet nozzle structure as set forth in claim 41 wherein: said semiconductor is selected from the group consisting of silicon, germanium, and gallium arsenide.

45. A jet nozzle structure as set forth in claim 44 wherein said semiconductor is crystalline.

46. An ink jet printing system incorporating at least one jet nozzle orifice for a liquid ink jet stream exiting therefrom which comprises:
a jet nozzle structure including a jet nozzle design in a substrate having at least a region of semiconductor at a surface thereof;
an electrical insulation layer on said substrate of said jet nozzle design where it is traversed in contacting relationship by said liquid;
electrode structure means integral with said jet nozzle structure and insulated from said jet stream exiting from said orifice, for electrohydrodynamically perturbing said jet stream for controlling formation of droplets in said stream temporally and spatially; and
ink jet printing means for ink jet printing with said droplets.

47. An ink jet printing system as set forth in claim 46 which includes an array of a plurality of said jet nozzle structures in said substrate, and wherein said ink jet printing means utilizes in a coordinated manner said droplets formed in each of said jet streams for said ink jet printing, and including a respective said electrical insulation layer and a respective said electrode structure means.

48. An ink jet printing system as set forth in claim 47 wherein said controlling of said formation of droplets in each said set stream is achieved either individually or collectively.

49. Ink jet printing system as set forth in claim 46 wherein: said semiconductor is selected from the group consisting of silicon, germanium, and gallium arsenide.

50. Ink jet printing system as set forth in claim 49 wherein said semiconductor is crystalline.

* * * * *